June 18, 1946.     F. H. HAGNER     2,402,395
PITCH AND ROLL INDICATOR
Filed Nov. 2, 1942     2 Sheets-Sheet 1
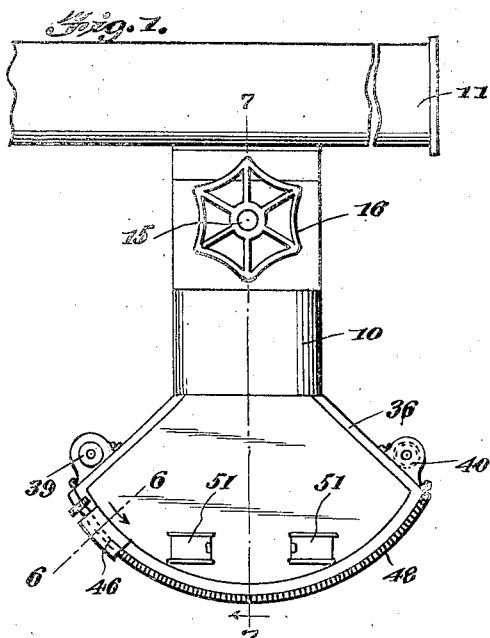
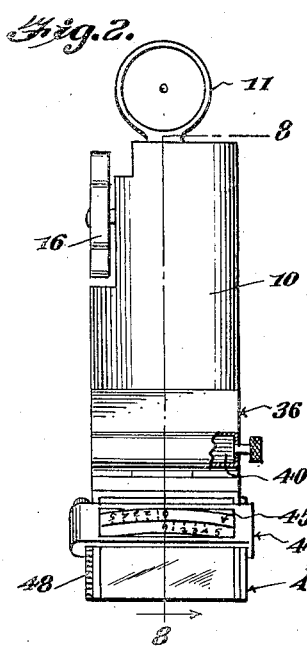
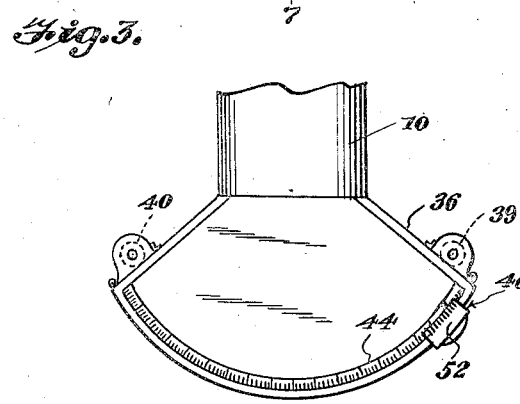
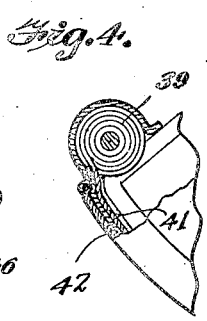
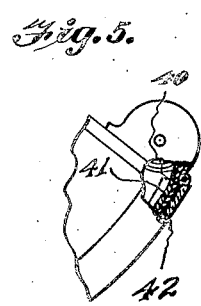
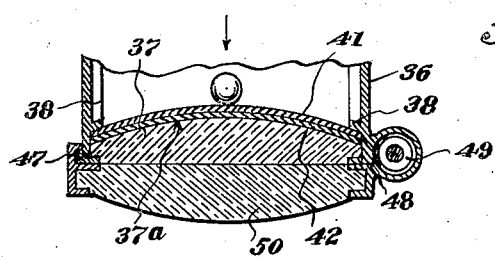
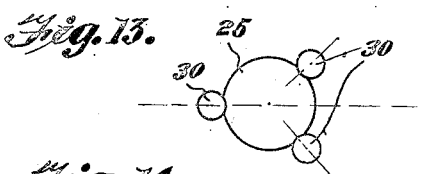
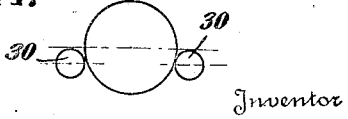
Inventor
FREDERICK H. HAGNER
By *[signature]*
Attorney June 18, 1946.     F. H. HAGNER     2,402,395
PITCH AND ROLL INDICATOR
Filed Nov. 2, 1942     2 Sheets-Sheet 2
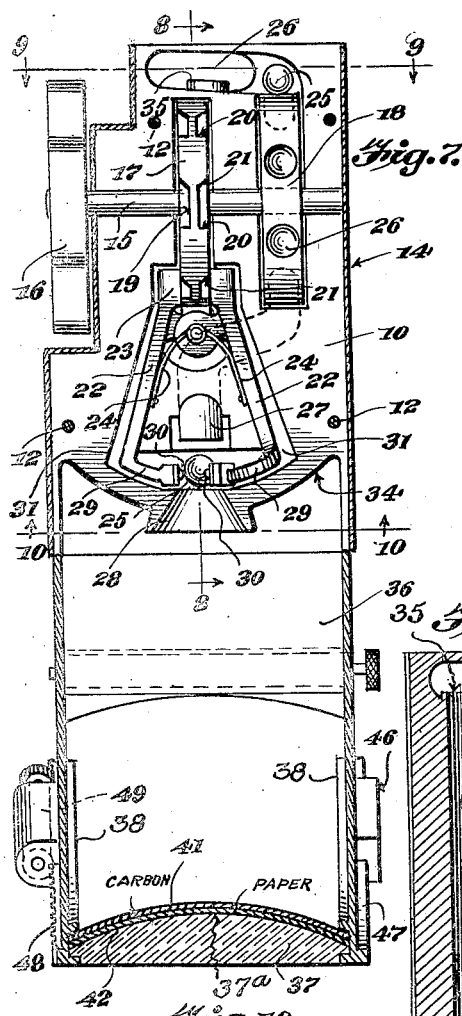
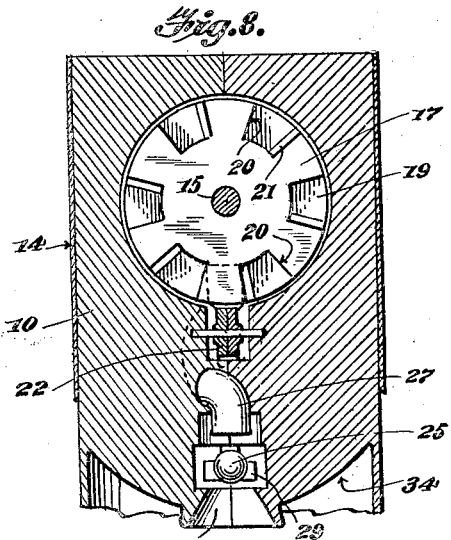
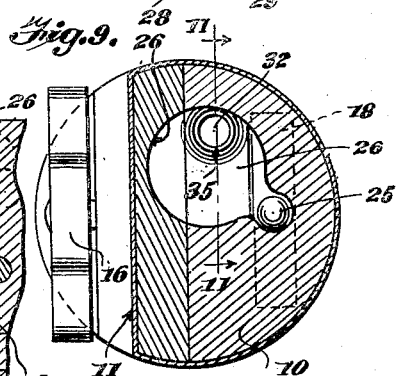
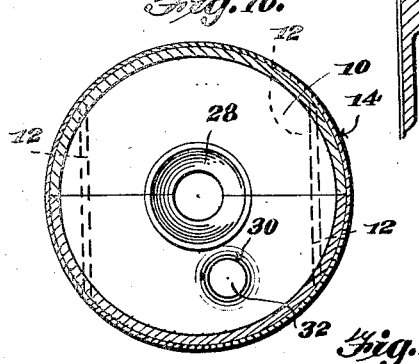
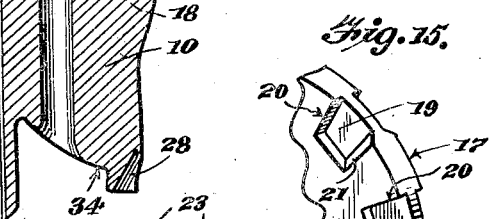
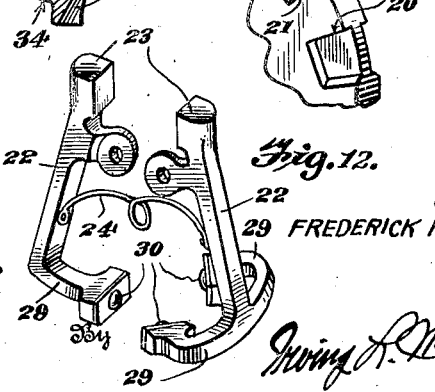
Inventor
FREDERICK H. HAGNER
By Irving R. McCathran
Attorney Patented June 18, 1946

2,402,395

UNITED STATES PATENT OFFICE 2,402,395

PITCH AND ROLL INDICATOR

Frederick H. Hagner, San Antonio, Tex.

Application November 2, 1942, Serial No. 464,232

6 Claims. (Cl. 33—206)

This invention relates to a pitch and roll indicator, and has for one of its objects the production of a simple and efficient means for controlling the dropping of a free-falling missile upon a chart for the purpose of accurately measuring the angle as well as the degree of tilt of the instrument upon which it is used.

A further object of this invention is the production of an efficient missile-releasing device for dropping a missile in a manner whereby the missile will not be subjected to any degree of deflecting interference.

Another object of this invention is the production of a simple and efficient means for measuring the recorded points of contact of a series of missiles dropped upon a chart associated with a missile-dropping device, for determining the angle as well as the degree of tilt of the instrument upon which said means is used.

In the drawings:

Figure 1 is a side elevational view of the pitch and roll indicator;

Figure 2 is a front elevational view;

Figure 3 is a side elevational view of the lower end of the indicator, looking at the opposite side from that shown in Figure 1;

Figure 4 is an enlarged fragmentary sectional view of one of the recording strip reels and a portion of the recording casing;

Figure 5 is a fragmentary side elevational view of the opposite recording strip reel and recording casing, certain parts being shown in section;

Figure 6 is an enlarged transverse sectional view taken on line 6—6 of Figure 1;

Figure 7 is a vertical sectional view taken on line 7—7 of Figure 1, certain parts being shown in elevation;

Figure 8 is a vertical sectional view taken on line 8—8 of Figure 2;

Figure 9 is a transverse sectional view taken on line 9—9 of Figure 7;

Figure 10 is a vertical sectional view taken on line 10—10 of Figure 7;

Figure 11 is a transverse sectional view taken on line 11—11 of Figure 7;

Figure 12 is a perspective view of the ball-suspending means;

Figure 13 is a bottom plan diagrammatic view illustrating the manner of suspending the missile or ball;

Figure 14 is a side elevational diagrammatic view illustrating the manner of suspending the missile or ball;

Figure 15 is a perspective view of a portion of the cam wheel which operates the ball-suspending means, and Figure 16 is a detail view of the recording sheet.

By referring to the drawings, it will be seen that 10 designates the casing or ball-dropping tube which may support a sighting tube 11, as shown in Figures 1 and 2. The tube 10 may be formed of two vertical sections and these sections may be held together by dowels 12, as shown in Figures 7 and 8, or the tube may be assembled in any conventional manner without departing from the spirit of the invention. A suitable jacket 14, as shown, may be placed around the tube 10, if desired, to encase the same. A transverse shaft 15 is carried near the top of the tube 10 and a finger wheel 16 is carried upon the outside of the tube 10 upon the outer end of the shaft 15. This finger wheel 16 is provided with six depressions upon the periphery of the wheel to receive the finger of an operator and to facilitate the rotation of the wheel 16.

A cam wheel 17 is carried by the shaft 15 intermediate the ends of the shaft, and this wheel extends longitudinally of the tube 10 and parallel to the finger wheel 16. A missile-dispensing wheel 18 is carried near the opposite end of the shaft 15 relative to the wheel 16 and in parallel spaced relation to the cam wheel 17.

The cam wheel 17 is provided with matched pockets 19 upon opposite sides thereof adjacent the periphery of the wheel 17, and these pockets are provided with abrupt shoulders 20 at one end thereof, and beveled or inclined faces 21 at their opposite ends thereof. Ball-gripping jaws 27 are pivotally secured together below the wheel 17, as shown in Figure 7. Each jaw 22 is provided with a head 23 at its upper end for frictional contact with the adjacent face of the wheel 17 in line with the pockets 19, the heads of the respective jaws engaging opposite faces of the wheel 17. An expansion spring 24 is interposed between the lower ends of the jaws below the pivot connection, as shown in Figure 7, to hold the heads 22 in frictional contact with the opposite faces of the wheel 17, and to force these heads 22 into the pockets 19 thereby spreading the lower ends of the jaws apart to release the ball 25 as described in the following.

The missile-dispensing wheel 18 is provided with a plurality of sockets 26 in the periphery thereof (preferably six in number) for receiving missiles in the nature of balls 25 from the reservoir 26 formed in the top of the casing or tube 10. A delivery channel 27 leads from the bottom of the dispensing wheel 18 to a point above the discharge opening 28. The jaws 22 are provided with ball-suspension ends 29 which extend toward each other, one jaw having one finger and the opposed jaw having two fingers, see Figure 12. The single finger of one jaw and the two fingers of the opposed jaw each carry freely rotating bearing balls 30 and these bearing balls 30 are adapted to suspend and support the ball 25 in the position just above the discharge opening 28, as shown in Figure 7.

The ball 25 is adapted to be suspended in the lower end of the tube 10 just above the discharge opening 25 upon a three-point suspension, as shown in diagram in Figures 13 and 14. The bearing balls 30 are adapted to engage the ball 25 just below its central axis or its equator in the manner shown in Figure 14, and when the jaws 22 are spread apart by the spring 24, as the heads 23 drop into the pockets 19, the ball 25 will drop through the discharge opening 28 and be freed from the jaws 22 with no degree of deflecting interference. These jaws 22 work within the notches 31 formed in the tube 10.

A refilling channel 32 is formed longitudinally of the tube 10 and is provided with an entrance opening 33 in the inverted cone-shaped lower end 34 of the tube 10. The opposite end of the channel communicates with the reservoir 26 and a retaining rim 35 is formed around the communicating end of the channel 32 with the reservoir 26. This rim 35 prevents balls within the reservoir 26 from rolling back through the refilling channel 30. The tube 10 is inverted from the position shown in Figure 11 for refilling the reservoir 26 with the balls which have been dropped into the recording chamber or casing 36 hereinafter described.

A flared recording chamber or casing 36 is suspended below the lower end of the tube 10, as shown in Figures 1, 2 and 7, and the bottom of this casing 36, as shown, is formed on the arc of a circle and is closed by a transparent plate 37 which is convex in cross-section, upon its inner face, as at 37ª. This casing 36 is provided with paper-retaining ribs 38 upon the inner face of the side walls of the casing 36 arranged in close relation to the inner face of the plate 37. A reel 39 is carried at one end of the casing 36 and a reel 40 is carried near the opposite end of the casing 36 adjacent the ends of the plate 37, as shown in Figures 1 and 3. A sheet of carbon paper 41 and a graduated sheet of recording paper 42, one upon the other, are wound upon the reel 39 and extend over the convex face 37ª. The side edges of these sheets are fitted under the paper-retaining ribs or flanges 38 as shown in Figure 6, to hold these sheets snugly in contact with the convex face 37ª of the plate 37. The remaining opposite ends of these sheets 41 and 42 are secured to the winding reel 40—note Figures 4 and 5. A suitable knob 43 is carried by the reel 40 to facilitate the winding of the sheets 40 and 41 upon the reel 40. The reels 39 and 40 are mounted in suitable removable protector housings so that the reels, carbon paper and paper may be renewed when the supply has been used. The paper sheet 42 is graduated for degrees of the arc to agree with the graduated scale 44 placed upon one side of the casing 36. The sheet 42 is also graduated to agree with the scale 45 described in the following, and carried by the movable measuring device 46, described in the following, also. Marking upon the sheet 42 is shown in Figure 16 to preserve the record of the true angle and degree of tilt of the instrument at the time of observation.

The measuring device 46 extends across the bottom of the casing 36 and plate 37, as shown, and this measuring device travels upon a track 47 located upon one side of casing 36 and a toothed rack 48 formed upon the opposite side of the casing 36. A vernier screw 49 is carried by this measuring device 46, and this screw 49 meshes with the toothed rack 48 for moving the measuring device 46 as the screw 49 is rotated. A magnifying glass 50 is carried by the measuring device 46, and this glass 50 moves longitudinally of and against the under face of the plate 37. A vernier gauge 52 is formed at one end of the measuring device 46 to register with the scale 44, as shown in Figure 3. Suitable openings are formed in one side of the casing 36 to facilitate access to the sheets 41 and 42 while threading the sheets in place. Closures 51 normally close the openings just described.

If desired, the wheel 16 may be replaced by an automatic operating means rather than a finger operated means. It should be further understood that any type of spring may be substituted for the spring 24, if desired.

The present invention constitutes an improvement upon my prior Patent #2,219,990, issued October 29, 1940, and my applications Serial Number 368,693, relating to an Observation and angle-determining instrument, and Serial Number 416,570 relating to a Portable range finder.

As the ball 25 drops upon the carbon paper 41, an impression will be made upon the sheet 42, and the relative position of the impression made upon the sheet 42 by the ball with respect to the graduations appearing upon the sheet will indicate whether or not the instrument was being held at an angle when the observation was taken and proper reckoning may be made as a result thereof. The amount of deflection may be measured by the scale 45 which is adjustable across the bottom of the instrument. The operation of the device in general is substantially the same as that previously described in my previous applications and patent above identified.

What is claimed as new is:

1. A pitch and roll indicator of the class described comprising a missile-dropping means, a missile-releasing means carried thereby, means for feeding a missile to the missile-releasing means, means for actuating the missile-releasing means for releasing the missile, and rotatable bearings carried by the missile-releasing means for suspending a missile end for dropping a missile when released therefrom with no degree of deflection interference.

2. A device of the class described comprising a missile-dropping means, said means comprising a cam wheel, a pair of pivoted arms located below said wheel, each arm having a wheel-contacting head, said wheel having depressions upon the side face thereof for receiving said heads, each arm having a depending end, means for automatically spreading said arms apart at their depending ends when said heads fall within the depressions of said wheel, and missile-suspending means carried by the depending ends of said arms.

3. A device of the class described comprising a missile-dropping means, said means comprising a cam wheel, a pair of pivoted arms located below said wheel, each arm having a wheel-contacting head, said wheel having depressions upon the side face thereof for receiving said heads, each arm having a depending end, means for automatically spreading said arms apart at their depending ends when said heads fall within the depressions of said wheel, missile-suspending means carried by the depending ends of said arms, each depression of said wheel having an abrupt entrance face, and an inclined ejecting face to permit the heads to suddenly drop into the depressions and to be gradually moved out of the depressions as said wheel rotates.

4. A device of the class described comprising a missile-dropping means, said missile-dropping means comprising an actuating member, missile-suspending arms pivotally connected together below said actuating member, means carried by the actuating member for swinging said arms toward and away from said actuating member, one of said arms having a missile-supporting finger and the other of said arms having two missile-supporting fingers, missile-contacting bearings carried by said fingers, said bearings being adapted to engage a missile below its transverse central axis, and means for swinging said arms and bearings away from a missile suspended thereupon in a manner whereby said missile will drop through force of gravity with no degree of deflecting interference.

5. A device of the class described comprising a missile-dropping means, said missile-dropping means comprising an actuating member, missile suspending arms pivotally connected together below said actuating member, means carried by the actuating member for swinging said arms toward and away from said actuating member, one of said arms having a missile-supporting finger and the other of said arms having two missile-supporting fingers, missile-contacting bearings carried by said fingers, said bearings being adapted to engage a missile below its transverse central axis, means for swinging said arms and bearings away from a missile suspended thereupon in a manner whereby said missile will drop through force of gravity with no degree of deflecting interference.

6. A device of the class described comprising a casing, a missile-dropping means, said casing having means for feeding missiles one at a time to the missile-dropping means, said casing having a reservoir communicating with the means for feeding the missiles to the dropping means, said casing having a recording means below the dropping means, said casing having a channel extending from the recording means to the reservoir for refilling the reservoir and a retaining rim formed around the channel in the reservoir for preventing missiles from dropping back through said channel after the missiles have entered the reservoir.

FREDERICK H. HAGNER.